(12) United States Patent  (10) Patent No.: US 8,756,251 B2
Chodavarapu et al.  (45) Date of Patent: Jun. 17, 2014

(54) METHOD AND APPARATUS FOR SLA PROFILING IN PROCESS MODEL IMPLEMENTATION

(75) Inventors: Prasad A Chodavarapu, Bangalore (IN); Ram Mohan, Karnataka (IN)

(73) Assignee: HCL America Inc., Sunnyvale, CA (US)

( * ) Notice: Subject to any disclaimer, the term of this patent is extended or adjusted under 35 U.S.C. 154(b) by 168 days.

(21) Appl. No.: 13/186,124

(22) Filed: Jul. 19, 2011

(65) Prior Publication Data

US 2013/0024477 A1  Jan. 24, 2013

(51) Int. Cl.
*G06F 17/30* (2006.01)
(52) U.S. Cl.
USPC .......................................... 707/784; 707/694
(58) Field of Classification Search
USPC .......... 707/706, 634, 636, 784, 694; 709/223, 709/226
See application file for complete search history.

(56) References Cited

U.S. PATENT DOCUMENTS

| 6,785,794 B2* | 8/2004 | Chase et al. ................ 711/170 |
| 7,877,495 B2* | 1/2011 | Stevens et al. .............. 709/229 |
| 7,937,460 B2* | 5/2011 | Vaught ....................... 709/223 |
| 2005/0071458 A1* | 3/2005 | Fisher et al. ................ 709/224 |
| 2009/0119396 A1* | 5/2009 | Kanda ......................... 709/223 |
| 2010/0281167 A1* | 11/2010 | Musman et al. ............. 709/226 |

* cited by examiner

*Primary Examiner* — Debbie Le
(74) *Attorney, Agent, or Firm* — Schwegman, Lundberg & Woessner, P.A.

(57) ABSTRACT

A method and system memory to store a logical process model defining a logically structured series of process activities in a process, and Service Level Agreement (SLA) profile information defining a pre-defined plurality of SLA profiles which are potentially applicable to respective process instances. Each SLA profile comprises at least one performance metric with respect to the process and/or at least one of the process activities. A rules engine queries case data with respect to a particular process instance, and automatically determines an applicable SLA profile based on the case data. The applicable SLA profile is then applied to the particular process instance, and may be altered during performance of the process instance in response to case data changes.

22 Claims, 11 Drawing Sheets

METHOD AND APPARATUS FOR SLA PROFILING IN PROCESS MODEL IMPLEMENTATION

TECHNICAL FIELD

This patent document pertains generally to the application of service-level agreements (SLAs) to processes, and more particularly, but not by way of limitation, to methods and apparatuses for SLA profiling in process model implementation.

BACKGROUND

Managed processes, for example to deliver products or services, are sometimes subject to defined performance goals or SLAs that may define particular metrics, such as cost or time efficiency, which are to be satisfied in the performance of respective instances of the process.

The management of processes subject to SLAs may be facilitated by process modeling or process mapping. A process model generally comprises structured information about at least the sequence and relationship of respective activities constituting a process or processes. Some process models may additionally define relationships of such process activities to other process elements or components, such as information technology (IT) systems, human resources, and the like. In certain embodiments, a business process model may therefore be part of a larger encompassing enterprise model. A process model may also be used to generate a graphical representation of process information. Visual modeling languages used to represent processes include Business Process Modeling Notation (BPMN) and the Event-driven Process Chain (EPC).

BRIEF DESCRIPTION OF THE DRAWINGS

Some embodiments are illustrated by way of example and not limitation in the figures of the accompanying drawings in which.

DETAILED DESCRIPTION

Figure 1:
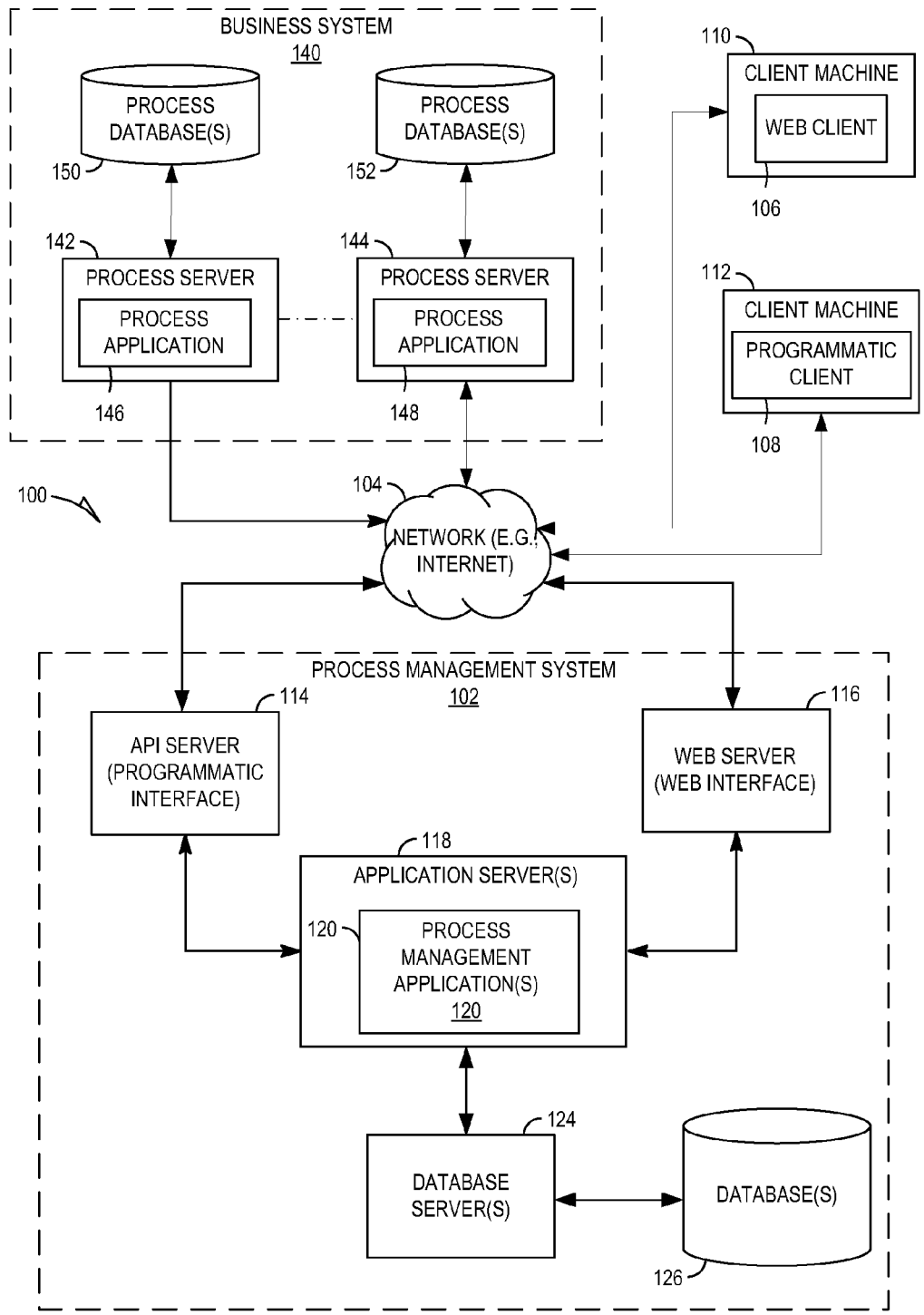
FIG. 1 is a schematic block diagram of a process management system interfaced with an enterprise system, in accordance with an example embodiment.

Example methods and systems for SLA profiling in process model implementation are described. In the following description, for purposes of explanation, numerous specific details are set forth in order to provide a thorough understanding of example embodiments. It will be evident, however, to one skilled in the art that the methods and systems according to the present disclosure may be practiced without these specific details.

According to an example embodiment, there is provided a system and a method to provide SLA profiling, or SLA differentiation, in implementation of a process. The system may comprise at least one memory to store: a logical process model defining a logically structured series of process activities in a process; and SLA profile information defining a predefined plurality of SLA profiles which are potentially applicable to respective process instances of the process defined by the logical process model, each SLA profile comprising at least one performance metric with respect to the process and/or at least one of the process activities.

The term "process" as used herein comprises a series of activities to produce a product or to perform a service, and is to be interpreted broadly as including a process group, a sub-process, or any collection of processes. Therefore, the totality of activities and/or processes which may be performed in an enterprise may also be referred to as a process. In instances where the process model information is therefore with respect to an enterprise, such as a business enterprise, the process model information may thus be in the form of an enterprise model. As used herein, the terms "logical process model" and "logical process model information" are employed interchangeably to refer to a logically structured series of process activities in a process.

The system may further comprise a rules engine to query case data with respect to a particular process instance, and automatically to determine an applicable SLA profile for the particular process instance based at least in part on the case data, the applicable SLA profile being selected from the predefined plurality of SLA profiles. The system may also comprise a computer including an SLA profile module to apply the applicable SLA profile to the process instance.

The at least one performance metric may comprise time periods or time goals that define a time within which a process activity or process is to be completed. Instead, or in addition, the at least one performance metric may comprise target maximum costs, product/service quality goals, and the like. The at least one performance metric of each SLA profile may comprise activity performance metrics that respectively define a metric applicable to individual process activities or subgroupings of process activities, and/or an overall performance metric that defines a metric applicable to the process as a whole.

Application of the applicable SLA profile to the process instance may comprise automatically associating at least one performance metric with the particular process instance and/or with respective process activities of the particular process instance. The application of the applicable SLA profile to the particular process instance may thus, in one embodiment, comprise automatically associating with at least some process activities selected from the logical process model respective activity performance metrics corresponding to the applicable SLA profile, the logical process model being common to the predefined plurality of SLA profiles in that the at least some process activities are selected from the common logical process model irrespective of which one of the predefined plurality of SLA profiles is determined to be the applicable SLA profile. The application of different SLA profiles to a common logical process model for different instances of the process is to be distinguished from the selection of different logical process models based on determination of different applicable SLA profiles. Each SLA profile may, in such instances, comprise a plurality of activity performance metrics associated with respective process activities selected from the common logical process model.

Instead of, or in addition to, associating respective activity performance metrics with at least some process activities, application of the applicable SLA profile to the process instance may comprise associating an overall performance metric with the process instance. In such embodiments, each SLA profile may comprise an overall performance metric with respect to performance of the entirety of the process instances.

In some embodiments, the SLA profile module may be configured to select from the common logical process model, based on the applicable SLA profile, a subset of process activities which are to be performed in the execution of the process instance. Different instances of the process may thus comprise different sequences of process activities and/or different subsets of process activities selected from the common logical process model, depending on the applicable SLA profiles of the respective process instances. Each SLA profile may comprise a set of process activity identifiers and associated activity performance metrics, each process activity identifier serving to identify those process activities which are members of the subset of process activities that are to be performed in the execution of process instances to which the SLA profile is applied. The set of process activity identifiers for at least some SLA profiles may comprise process activity identifiers for all of the process activities of the common logical process model. Instead, or in addition, the set of process activity identifiers for one or more SLA profiles may comprise process activity identifiers for a subset of the common logical process model.

Instead, or in addition, the SLA profile information may comprise metadata associated with process activities forming part of the logical process model, to indicate at least one SLA profile that is associated with respective process activities. Such metadata may be stored as part of the logical process model. At least some process activities of the logical process model may thus have associated therewith metadata identifying at least one SLA profile that applies to that process activity. Metadata associated with at least one process activity may indicate a plurality of SLA profiles with which the at least one process activity is associated.

The case data on which initial determination of the applicable SLA profile is determined may change during performance or execution of the particular process instance, potentially resulting in a different SLA profile being applicable to the particular process instance based on the updated case data. The system may comprise an SLA update module to apply a different SLA profile to the particular process instance during performance of the particular process instance, subsequent to initial application of the applicable SLA profile to the particular process instance. In some embodiments, the SLA update module may be configured to automatically associate with one or more remaining process activities respective activity performance metrics corresponding to the different SLA profile.

The SLA update module may be configured to automatically determine, in response to a change in the case data for the particular process instance, that an SLA profile other than the previously determined applicable SLA profile is applicable to the particular process instance, and automatically to apply the different SLA profile to the particular process instance. Thus, for example, if the applicable SLA profile is determined based on a particular variable, such as a relevant entity's income, and the variable exceeds a threshold during performance of the particular process instance, the SLA update module may automatically change the effect of the applicable SLA profile. The SLA update module may thus monitor one or more memories or databases storing the case data upon which applicable SLA determination is based. Instead, or in addition, the SLA update module may be configured to receive user input indicating a desired change in SLA profile, and to apply the different SLA profile to the particular process instance in response to the user input, thus providing for manual or selective SLA profile update or change.

In some embodiments, the logical process model may form part of process model information. In such cases, the process model information may comprise the logical process model together with operationalization data regarding various components required for operationalization of the process and on which process activities may be dependent. The logical process model may include a sequence in which activities of the process are performed; rules determining subsequent activities to be performed; key performance indicators (KPIs); and the like. The operationalization data may include human resource roles for performing respective activities; IT systems supporting respective activities; data dependency information regarding respective activities; physical infrastructure associated with respective activities, such as vehicles, machinery, and the like; and other elements associated with the process. Enterprise elements or process elements modeled in such operationalization data may include a value chain, business domains/sub-domains, business functions/sub-functions, processes, activities, information/data, IT applications, IT hardware, human resources, physical assets, and any other elements relevant to the enterprise. It is to be appreciated that the term "logical process model" refers to the depiction, specification, or mapping of a series of activities of an associated process, excluding process operationalization elements, e.g., IT system components, human resource information, and data dependency information.

Architecture

An example embodiment will now be described with reference to FIG. 1, which shows a network diagram depicting a client-server system 100, within which one example embodiment may be deployed. A networked process management system 102 in the example form of a dynamic process modeling system, provides server-side functionality, via a network 104 (e.g., the Internet, a Wide Area Network (WAN), or a Local Area Network (LAN), to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more process management application(s) 120 (see FIG. 2), the process management application(s) 120 being, in this example, enterprise model applications. The application server(s) 118 are, in turn, shown to be coupled to one or more databases server(s) 124 that facilitate access to one or more database(s) 126. The database(s) 126 may thus comprise one or more memories in which process model information, SLA profile information, and the like may be stored for access by the process management application(s) 120.

The system 102 is also in communication with a process system which supports a process which is to be modeled by the process management application(s) 120 (e.g., business process models (BPM)). In the example embodiment, the process system is a client enterprise system, generally indicated by reference numeral 140 and herein referred to as "business system", which supports a business enterprise. The system 102 of the example embodiment of FIG. 1 may therefore be an enterprise model system. The process management application(s) 120 may be in communication with components of an IT system of the enterprise, in particular being in communication with a number of process servers 142, 144 forming part of the IT infrastructure of the business system 140. Each of the process servers 142, 144 supports one or more process applications 146, 148, each process application 146, 148 providing functionalities employed in the performance of an associated activity or process supported by the business system 140. Each process server 142, 144 may be in communication with one or more associated database(s) or process database(s) 150, 152, to read and/or write associated process data to the respective process datastore(s) 150, 152.

For example, process application 146 may be an accounting application, the process data in the associated process datastore(s) 150 comprising client account information, while process server 144 may be a case management application, the process data in the associated process datastore(s) 152 comprising records of respective cases processed by the business system 140. It will be appreciated that the business system 140 may typically comprise a greater number of process servers 142, 144 and process datastores 150, 152, but FIG. 1 shows only two such process servers 142, 144, for ease of explanation. It is further to be appreciated that communication and interfacing between respective process servers 142, 144 may occur via the network 104, while some of the process servers 142, 144 may be in direct communication.

The web client 106 accesses the process management application(s) 120 via the web interface supported by the web server 116. Similarly, the programmatic client 108 accesses the various services and functions provided by the process management application(s) 120 via the programmatic interface provided by the API server 114.

The process management application(s) 120 may provide a number of functions and services to users that access the process management system 102, for example providing analytics, diagnostic, predictive and management functionality relating to system architecture, processes, and the activities of the enterprise supported by the business system 140, as well as providing process management functionalities, such as workflow applications. Respective modules for providing these functionalities are discussed in further detail with reference to FIG. 2 below. While all of the functional modules, and therefore all of the process management application(s) 120 are shown in FIG. 1 to form part of the process management system 102, it will be appreciated that, in alternative embodiments, some of the functional modules or process management applications 120 may form part of systems that are separate and distinct from the process management system 102.

Further, while the system 100 shown in FIG. 1 employs a client-server architecture, the example embodiments are of course not limited to such an architecture, and could equally well find application in a distributed, or peer-to-peer, architecture system, for example. The process management application(s) 120 could also be implemented as standalone software programs, which do not necessarily have networking capabilities.

Process Management Application(s)

Figure 2:
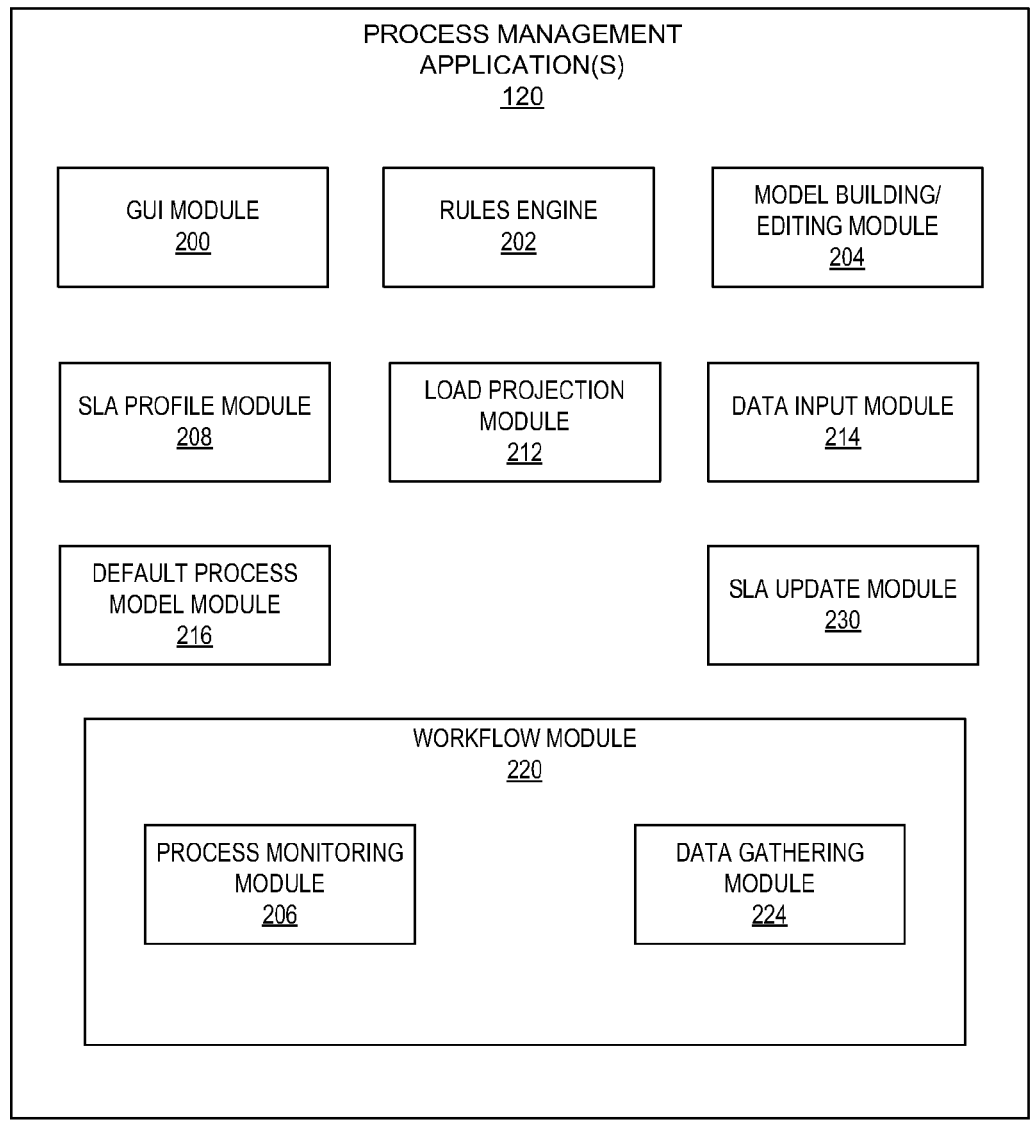
FIG. 2 is a schematic block diagram of process management application(s) forming part of the example process analysis system.

FIG. 2 is a block diagram illustrating multiple functional modules of the process management application(s) 120 of process management system 102 shown in FIG. 1. Although the example modules are illustrated as forming part of a single application, it will be appreciated that the modules may be provided by a plurality of applications The modules of the application(s) 120 may be hosted on dedicated or shared server machines (not shown) that are communicatively coupled to enable communications between server machines. The modules themselves are communicatively coupled (e.g., via appropriate interfaces) to each other and to various data sources, so as to allow information to be passed between the modules or so as to allow the modules to share and access common data. The modules of the application(s) 120 may furthermore access the one or more databases 126 via the database servers 128 (FIG. 1).

The process management system 102 may therefore provide a number of modules whereby a user may build or define a process model(s) or enterprise model for the business system 140, monitor the execution of activities forming part of the process, and perform automated diagnostic or predictive analysis of the process model. To this end, the process management application(s) 120 is shown to include at least one default process model module 216 to provide default process models. In instances where the process model is in respect to a business enterprise, the default process model module 216 may provide default business process models (BPM) which are to serve as bases for a user to define a business process model specific to the business system 140. The default BPM's may be predefined by a supplier of the business process management application(s) 120 and are in respect to generic business processes relating to a variety of types of businesses or types of business activities. A user may thus, as a starting point for defining an enterprise-specific BPM, select one or more default process models which most closely approximate the business processes performed by the business system 140. The default process model module 216 may typically provide default logical process models indicating a series of activities, without specific operationalization information indicating particular process elements or support elements on which the activities are dependent.

A model building/editing module 204 is provided to enable a user or administrator to define an enterprise-specific process model, either by editing, adapting, or building on a selected default enterprise model, or by building an enterprise model from scratch. The model building/editing module 204 also enables the editing of the enterprise model in response to changes in the business system 140 or the associated processes. As mentioned above, such an enterprise model is a process model which may represent sequences and relationships of business processes, business process activities, as well as relationships of such business process activities to the information technology (IT) infrastructure, process applications 146, 148, and process data. An example enterprise model is described in greater detail with reference to FIGS. 5-6 below.

The process management system 102 may include a logical process model together with dependency information. The logical process model may define a plurality of activities forming part of the process, and may define the relationship between activities, such as the sequence in which activities are performed, and/or rules determining choices between respective activities. The dependency information may define process elements which contribute to performance of respective process activities. The dependency information may include IT system dependency information, which defines IT system elements, such as software and hardware components, contributing to respective activities. The dependency information may further include human resource dependency information, which defines particular human resources, people, or personnel contributing to respective activities. The dependency information may also include, as part of the IT system dependency information, datastore dependency information that indicates the relationship between respective activities and associated datastores that are accessed during execution of the respective activities. It is to be appreciated that, with respect to a particular activity, datastore dependency information specifies the relationship between the activity and datastores which are accessed in execution of the particular activity. The dependency information may yet further include data dependency information which indicates dependency of process activities on data in respective datastores which may be accessed in execution of respective activities, and/or data flow dependency information which indicates process elements contributing to the flow of data into particular datastores.

The process management application(s) 120 further includes a graphic user interface (GUI) module 200 to generate and manage an interactive GUI to display various aspects of the process model, and to permit user management of the process model. In instances where all the processes of the business system 140 are defined in a process model (e.g., instances where the process model is an enterprise model), it is typically not possible to display a representation of all of the processes and/or an entire business architecture in a single view, and the GUI will allow user selection of different levels or layers of the enterprise model for viewing. Such drill-down functionality is described in greater detail below with reference to FIGS. 5-6.

A data input module 214 provides functionality to permit the input of data for use in process model analysis, process management, and the like. Information defining performance metrics for particular SLA profiles may, for example, be inputted via the data input module 214. The data input module 214 may be configured for manual input of this information, and may instead or in addition provide for automatic integration of, e.g., case data from other databases. For example, employee information may automatically be obtained from a Human Resources database (not shown) forming part of the business system 140.

The process management application(s) 120 further includes an SLA profile module 208 to manage a plurality of SLA profiles, and to apply respective applicable SLA profiles to the particular process instances. The SLA profile module 208 may be configured to facilitate, in cooperation with the data input module 214, creation and/or editing of the plurality of SLA profiles. A user may thus use the SLA profile module 208 to define a number of process activities associated with a particular SLA profile, and may specify performance metrics with respect to at least some of the process activities. The user may, instead or in addition, specify a performance metric that applies to performance of the totality of process activities which are to be executed under the SLA profile. As used herein, the term "activity performance metric" refers to a performance metric that applies to a particular process activity or to a particular subgrouping of process activities, while the term "overall performance metric" refers to a performance metric that applies to the entirety of process activities that are to be executed under the relevant SLA profile.

The SLA profile module 208 may further be configured to apply one of the plurality of SLA profiles to a particular process instance by, for example, associating respective activity performance metrics with corresponding process activities, and/or by associating an overall performance metric with the particular process instance.

A user may thus provide, via the rules engine 202, performance metrics that may, in some embodiments, be described as failure definitions which specify what constitutes failure of a particular process/activity. The respective SLA profiles may specify, in measurable terms, contractual service commitments describing the minimum performance criteria an associated process is required to meet. Failure to comply with the requirements of an SLA may be specified as constituting failure of the associated process. As used herein, the terms "SLA" and "SLA profile" relate not only to contractual commitments, but may in some embodiments apply to performance goals that have not explicitly been agreed upon or captured in an explicit agreement. SLA profiles may, for example, be employed for internal process management within an organization.

A rules engine 202 may be provided to determine a particular SLA profile that is applicable to particular process instances. To this end, the rules engine 202 may be configured to query case data relevant to particular process instances, and to determine the respective applicable SLA profiles based on the case data. The rules engine 202 may therefore have stored in association therewith SLA profile determination rules defining, with respect to each of the plurality of SLA profiles, a set of conditions which are to be met in order for the SLA profile to be applicable to a particular process instance. The rules engine 202 facilitates user definition of the SLA profile determination rules.

The rules engine 202 may further enable the definition of performance indicators, such as key performance indicators (KPIs), in relation to respective processes or process activities. Such performance indicators serve to provide quantifiable performance measurement of an associated process or process activity.

The process management application(s) 120 may include a workflow module 220 that provides functionality for workflow management with respect to one or more processes. Such workflow functionality serves to identify progress of the process state of respective process instances, and may automate, at least to some degree, some aspects of the process. The workflow module 220 may additionally serve to assign process activities to particular human resource entities, to optimize the utilization of process resources and/or to ensure satisfaction of SLA performance metrics. In other embodiments, workflow functionality may be provided by a workflow application separate from the process management application(s) 120, such as a workflow application, for example, executing on the application server(s) 118.

The workflow module 220 may further include a data gathering module 224 to gather and collate information regarding the performance of respective processes and/or activities. To this end, the data gathering module 224 may cooperate with monitoring applications (not shown) installed in each of the process servers 142, 144 and/or client machines (not shown) forming part of the business system 140. The system 102 may thus gather and record information regarding activities performed by respective elements forming part of the business system 140. Data events such as data synchronization, data collation, or data transfer between data repositories may be logged or recorded, to facilitate tracking or monitoring of performance of the associated business activities.

To this end, the workflow module 220 may include a process monitoring module 206 to monitor performance of processes defined in the business model. Data gathered by the data gathering module 224 may thus automatically be compared to process activities which are scheduled according to the enterprise model, thereby to determine progress of individual process instances relative to an SLA profile applied to that process instance. Such process monitoring may serve preemptively to identify potential failure to meet the performance metrics of the applied SLA profile. The process monitoring module 206 may further compile historical data regarding performance of individual process instances.

To facilitate process management, the process management application(s) 120 may include a load projection module 212 to calculate a projected load on particular processes and/or activities defined in the enterprise model. By load is meant the amount of work which is performed by a process element at a particular point in time, or over a particular period. The load on a particular process element or process activity may, for example, be calculated as a number of cases or process instances which is scheduled to be processed. A "case" is an instance of a process. For example, in a process for generating invoices, a particular case or process instance may refer to a specific invoice generated for a particular customer. Load projection may be calculated with respect to a particular process step or activity, with respect to a specified process or sub-process, with respect to a process group, or with respect to the entirety of the enterprise model. The load projection module 212 may be configured to calculate the load projection based, in part, on current load information, which may be gathered by the data gathering module 224.

The process management application(s) 120 may further include an SLA update module 230 to update or change an SLA applied to a particular process instance in-flight or during the performance of a process instance. The SLA update module 230 may be configured to permit automatic or selective updating of an applicable SLA profile. The SLA update module 230 may thus be configured to monitor case data associated with process instances during performance thereof, and automatically to change an applied SLA profile if a change in the case data results in a SLA profile different from the initially determined applicable SLA profile being applicable to the process instance. Instead, or in addition, the SLA update module 230 may enable an operator to select a particular process instance and to effect selective application of a different SLA profile to the process instance.

Data Structures

Figure 3:
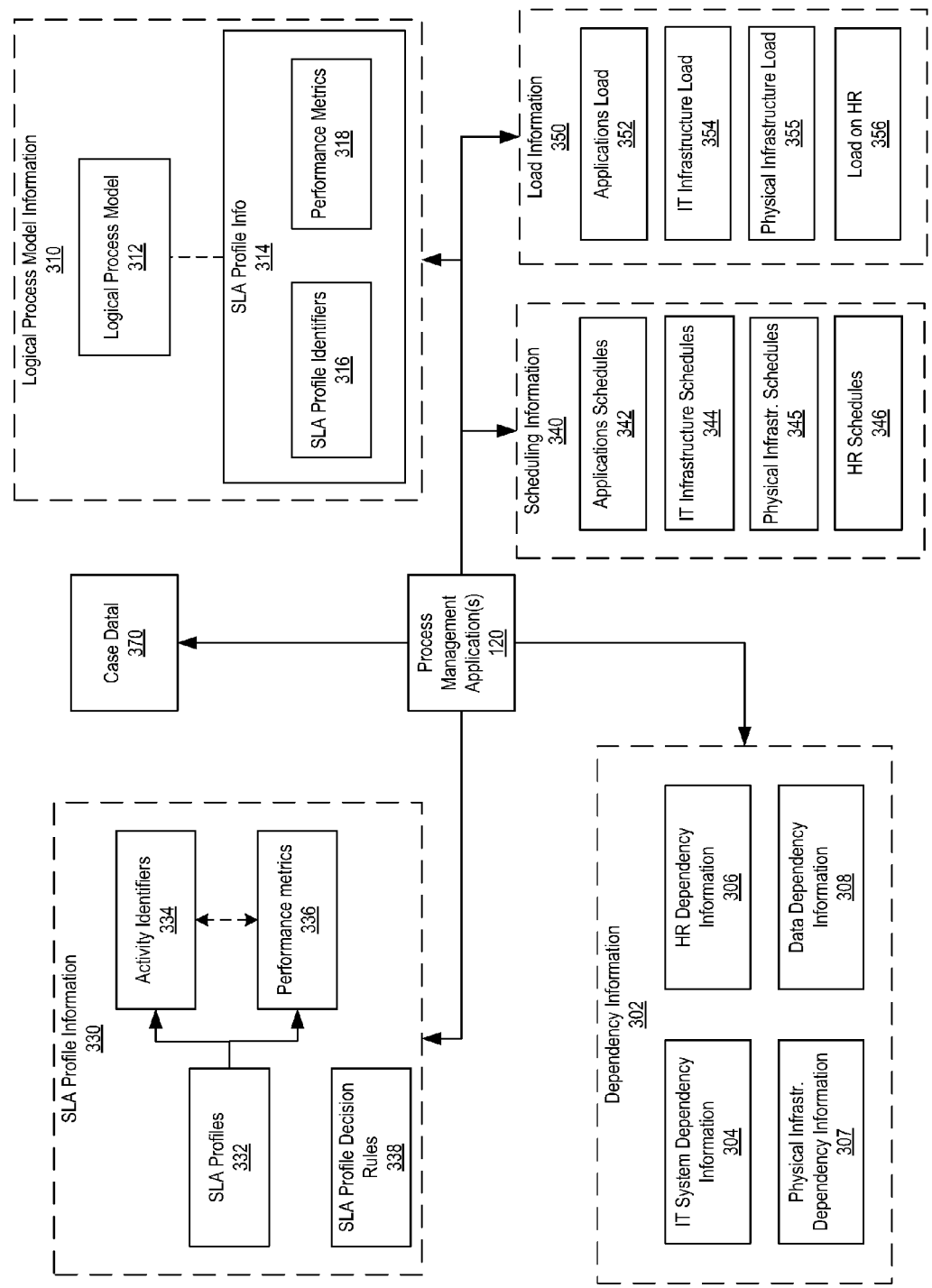
FIG. 3 is a schematic diagram of a data structure of information used by process management applications according to an example embodiment.

FIG. 3 is an entity-relationship diagram illustrating various tables, data repositories, or databases that may be maintained within the databases 126 (FIG. 1), and that may be utilized by the process management application(s) 120.

The databases 126 may include logical process model information 310, in this example being in respect of a business process performed by means of the business system 140. The logical process model information 310 includes a logical process model 312 comprising structured data defining the processes constituting the enterprise model, and showing relationships between respective process activities constituting the respective processes. In the current example, the logical process model 312 may be a logical process model defining the sequence of process activities abstractly, without defining relationship of the activities or processes to process elements associated with operationalization of the process, which may be provided by the dependency information 302.

The database(s) 126 may further include SLA profile information defining a predefined plurality of SLA profiles that are potentially applicable to respective process instances of the process defined by the logical process model 312. In the example embodiment described with reference to FIG. 3, the SLA profile information is described as being provided in two separate data structures, namely, on the one hand, SLA profile information 314 comprising metadata associated with the logical process model 312, and, on the other hand, SLA profile information 330 comprising SLA profile records stored in a data structure separate from the logical process model 312. In other embodiments, only one of these two data structures may be provided, although both arrangements of SLA profile information 314, 330 are described with reference to FIG. 3, for ease of reference. It will be appreciated that, in yet further embodiments, any suitable SLA profile information data structure may be used in association with logical process model information 310. The SLA profile information 330 may in some embodiments be stored in a separate SLA database.

The SLA profile information 314 may comprise SLA profile identifiers 316 associated with respective process activities forming part of the logical process model 312, to indicate an association between particular process activities and respective SLA profiles. At least some of the process activities in the logical process model 312 may therefore have associated therewith a plurality of SLA profile identifiers 316, indicating that those process activities may form part of any one of the SLA profiles indicated by the SLA profile identifiers 316. At least some of the SLA profiles are associated with a subset of process activities of the logical process model 312 for a particular process, in which case only the subset of process activities will have associated therewith the relevant SLA profile identifiers 316. The SLA profile information 314 may also include performance metrics 318 comprising activity performance metrics indicating performance metrics applicable to particular process activities, and/or an overall performance metric applicable to an associated process as a whole.

The SLA profile information 330 may comprise a plurality of SLA profiles 332 or profile records, each of which comprises a list of activity identifiers 334 that respectively identify process activities selected from the logical process model 312 and forming part of the associated SLA profile 332. The SLA profile information 330 further includes performance metrics 336 associated with the respective activity identifiers 334.

The SLA profile information 330 may further include SLA profile decision rules 338 that define conditional expressions or decision rules to determine applicability of particular SLA profiles 332 to respective instances of the process. The SLA profile decision rules 338 may, for example, specify certain conditions which are to be met in order for an accelerated SLA profile to be applied to a process instance. In other embodiments, the SLA profile decision rules 338 may be incorporated in the rules engine 202 (FIG. 2), or may be stored integrally with the SLA profile information 330, 314, or with the logical process model 312.

The database(s) 126 may also include case data 370 with respect to a plurality of cases or process instances to be performed by means of the business system 140. Such case data 370 may include information pertinent to business facts and entity information relating to each process instance. For example, the case data 370 for a particular process instance may include identity details of a subject of the process instance, information regarding the client's income or pay grade, the client's credit rating, and other data that may be relevant to differentiating between a plurality of SLAs that are potentially applicable to the process.

The databases 126 may also include dependency information 302 comprising structured information regarding dependencies of respective processes and/or process activities of the enterprise model. The dependency information 302 includes IT system dependency information 304 that comprises information regarding process dependency on IT system elements of the business system 140. The IT system dependency information 304 may thus include information regarding dependency of processes or activities on software such as process applications 146, 148, as well as dependency on IT infrastructure. The IT system dependency information 304 may also include datastore dependency information indicative of relationships between respective activities and datastores which are accessed in performance of the respective activities. The IT system dependency information 304 enables the generation of an interactive GUI displaying those process applications and process servers on which a selected process or process activity is dependent.

The dependency information 302 may further include human resources dependency information 306 in which is stored structured information regarding the dependency of respective processes or process activities on particular human resource components, such as people or personnel. The HR dependency information 306 may for example specify the job role or personnel department responsible for the performance of a particular process activity.

Physical infrastructure dependency information 307 may also be included in the dependency information 302 to indicate the dependency of respective process activities on physical infrastructure components. Such physical infrastructure components may include, for example, vehicles, machinery, supply-chain elements, buildings, and the like. The dependency information 302 may also include data dependency information 308 that indicates, for example, dependence of respective process activities on particular data elements. The data dependency information 308 may also indicate dependency of particular process activities on the age or staleness of data in associated datastores, the data flow history of associated datastores as it relates to data quality, the referential integrity or data integrity of data in associated datastores, or the like. The data dependency information 308 may additionally comprise information regarding process elements, such as process applications, process servers, personnel, and/or business processes which contribute to the flow of data into respective datastores accessed during performance of associated activities/processes, and upon which such activities/processes are therefore dependent for the availability and/or quality of data.

It will be appreciated that the logical process model information 310 and the dependency information 302 together provide process model information (or enterprise model information) defining a process architecture for the business system 140, the process architecture comprising, on the one hand, the processes and activities defined by the logical process model 312, and, on the other hand, information on the operationalization of the processes and activities as defined by the dependency information 302.

Scheduling information 340 may be provided to facilitate process and workflow management. The scheduling information may include: applications downtime schedules 342 indicating scheduled unavailability or downtime of process applications 146, 148; IT infrastructure downtime schedules 344 indicating scheduled unavailability of IT infrastructure elements or components, such as process servers 142, 144; physical infrastructure schedules 345 indicating scheduled availability of physical infrastructure elements; and human resource schedules 346, which may include holiday calendars or personnel unavailability schedules, to indicate when personnel, people, or other human resource components supporting the process are scheduled for unavailability.

The databases 126 may furthermore include load information 350 regarding a current and a projected load on respective elements in the process. In particular, the load information 350 may include information on applications load 352 indicative of current and projected load on process applications 146, 148; IT infrastructure load 354 indicative of current and projected loads on the IT infrastructure the business system 140; physical infrastructure load 355 indicative of current and projected loads on physical infrastructure elements; and information regarding current and projected load on human resources 356. Provision of the load information 350 facilitates analysis of the business process model, and may be particularly useful in load balancing and workflow management.

Figure 4:
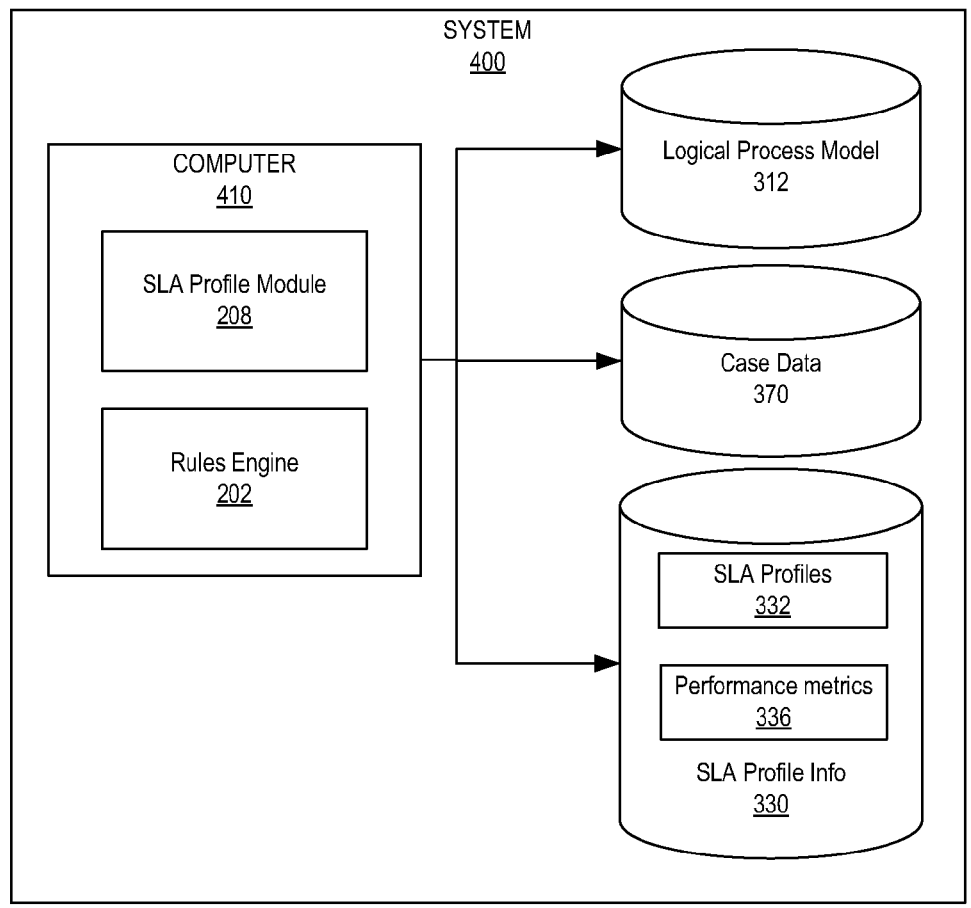
FIG. 4 is a high-level schematic diagram of another example system for managing a process.

FIG. 4 is a high-level entity relationship diagram of another example configuration of an enterprise model system 400. The system 400 may include a computer 410 which may include a rules engine 202 to query case data 370 with respect to a particular case or process instance, and automatically to determine an applicable SLA profile for the process instance based, at least in part, on the case data 370. To this end, the system 400 may include one or more memories or databases to store a logical process model 312, case data 370, and SLA profile information 330. The SLA profile information 330 comprises a plurality of SLA profiles 332 potentially applicable to the same process defined by the logical process model 312. The SLA profile information 330 further includes performance metrics 336 associated with the respective SLA profiles 332. The system 400 further includes a SLA profile module 208 to apply the applicable SLA profile 332, as determined by the rules engine 202 (FIG. 2), to the process instance. Like numerals indicate like elements in FIG. 3 and in FIG. 4. It is to be noted that the databases or memories of FIG. 4 are illustrated as separate entities, but that the logical process model 312, the case data 370, and the SLA profile information 330 can instead be stored in a single database, or in a greater number of dispersed databases, while the logical process model 312 may be stored either internally in the computer 410, or may be stored externally.

Flowcharts

Figure 5:
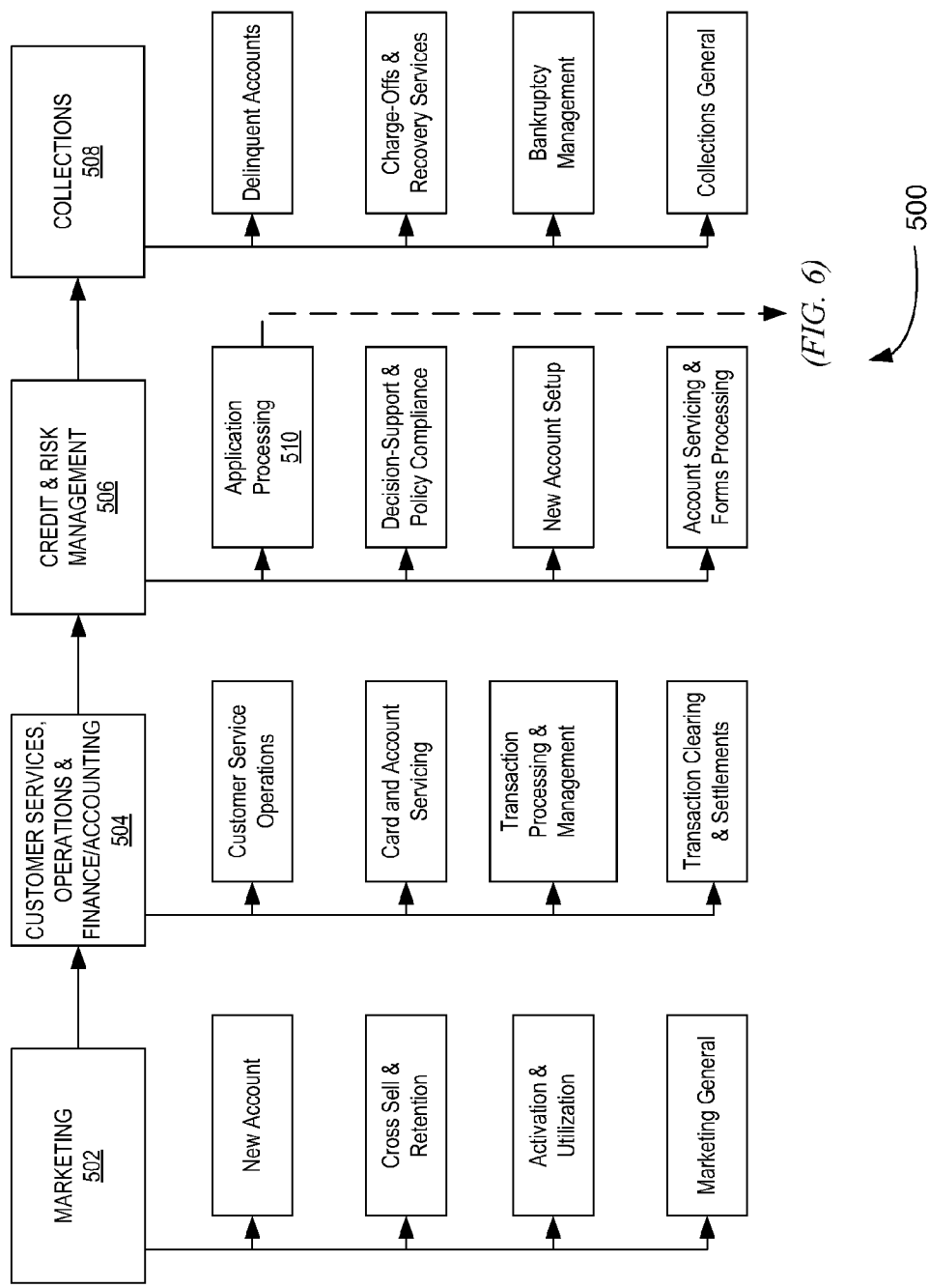
FIG. 5 is a high-level view of a value chain forming part of a process model according to an example embodiment.

The concepts described above will now be further explained by way of example with reference to extracts from example GUIs that may be generated by the GUI module 200 according to an example embodiment. In FIG. 5, reference numeral 500 generally indicates an example graphical representation of a value chain diagram providing an overview of an example process defined by an enterprise model. The value chain represents the chain of business activities that generate value for an enterprise. The example value chain diagram 500 is with respect to a business which provides credit services to customers. The value chain diagram 500 represents a highest level of the enterprise model and comprises, at the highest level, a series of organizational units. In this example, the value chain diagram 500 comprises the organizational units of Marketing 502; Customer Services, Operations and Finance/Accounting 504; Credit and Risk Management 506; and Collections 508.

As illustrated in FIG. 5, the value chain diagram 500 specifies the functional decomposition of each of the organizational units 502 to 508 in respective series of functions or processes. Thus, for example, the organizational unit of customer services, operations and finance/accounting 504 is comprised of a series of functions or processes. A user can view further organizational details or functional decomposition of each of the functional processes constituting customer services, operations and finance/accounting 504 by selecting the associated function or process in the GUI. Organizational units may thus be categorized by the function they perform. It is to be noted that functions may be specific to a business domain/sub-domain, or may be shared across domains/sub-domains. For example, recruiting and other human resource functions may be shared functions, while, for instance, warehouse operations may be specific to a sales and distribution area of a large retailer.

Figure 6:
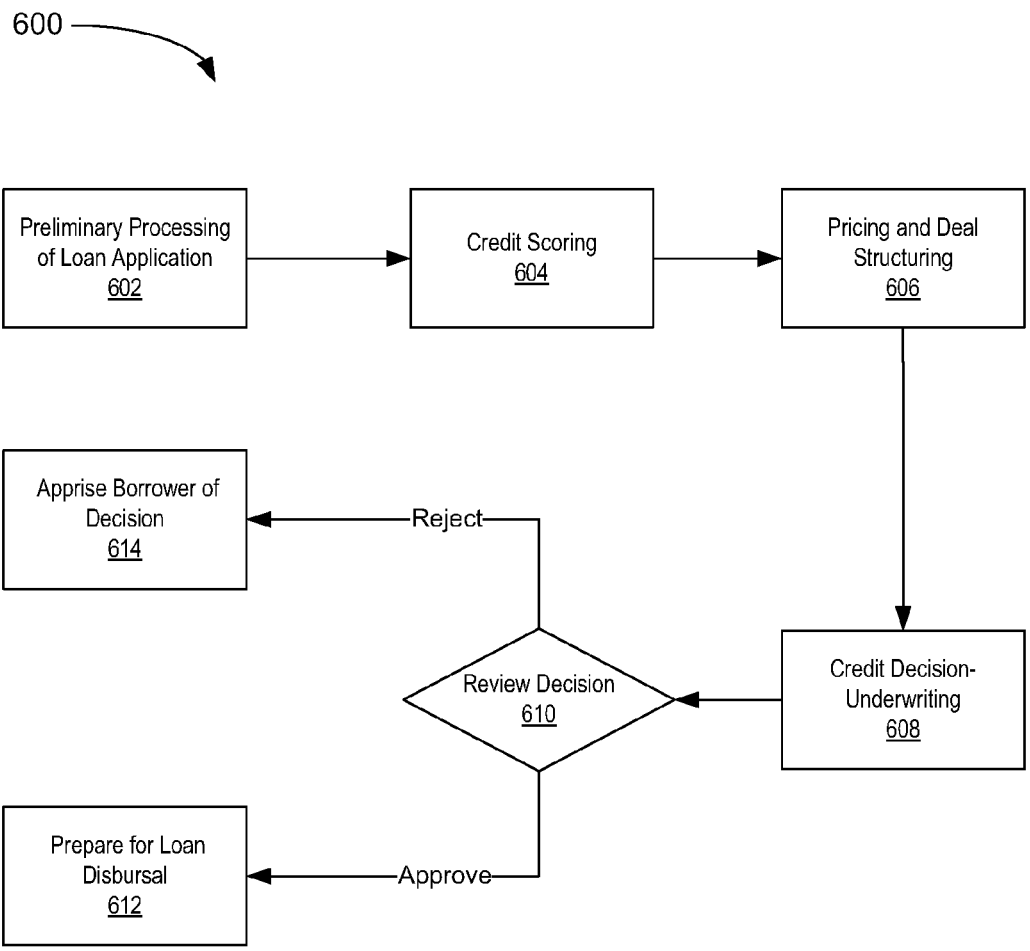
FIG. 6 is an example of a logical process model comprising a sequence of process activities.

In FIG. 6 reference numeral 600 generally indicates an example embodiment of a process with respect to which SLA differentiation may be employed. The example process 600 is for a loan origination process and comprises a series of process activities to generate and approve an application. Process 600 illustrates the logical sequence of these process activities and is thus a graphic representation of logical process model information 310 with respect to FIG. 3. The sequence of activities shown in FIG. 6 is a functional decomposition of the function of Application Processing 510 in the value chain diagram 500 shown in FIG. 5. The diagram of FIG. 6 is thus a lower-level view of one of the functions forming part of the value chain diagram 500 of FIG. 5, and it will be appreciated that each of the functions shown in FIG. 5 may similarly be viewed at a lower-level, or in greater magnification. SLA profile differentiation as described herein may be provided with respect to processes or sub processes at any level of magnification or particularization.

The process 600 comprises receiving a loan application and performing preliminary processing, at operation 602, of the loan application. The preliminary processing comprises validation of details furnished by a loan applicant in the loan application, checking for completeness of documents submitted by the applicant, as well as background verifications. Thereafter, creditworthiness of the applicant is assessed in a credit scoring operation, at 604. Thereafter, pricing and deal structuring is performed, at operation 606, by creating a complete credit package detailing repayment options, flexible interest rates, and the like. The pricing and billing structuring operation 606 also includes deciding whether a loan which is to be granted on the application is to function on risk-based pricing, or whether a relationship-based pricing scheme will be followed.

The organization then decides, at operation 608, whether or not to grant the loan application, and underwriting of the loan is performed. This decision is, however, reviewed at decision operation 610. If the loan application is approved, preparation for loan disbursal, at operation 612, is commenced. If, however, the decision to grant the loan application is rejected, the loan applicant is apprised of such rejection at operation 614.

Figure 7A:
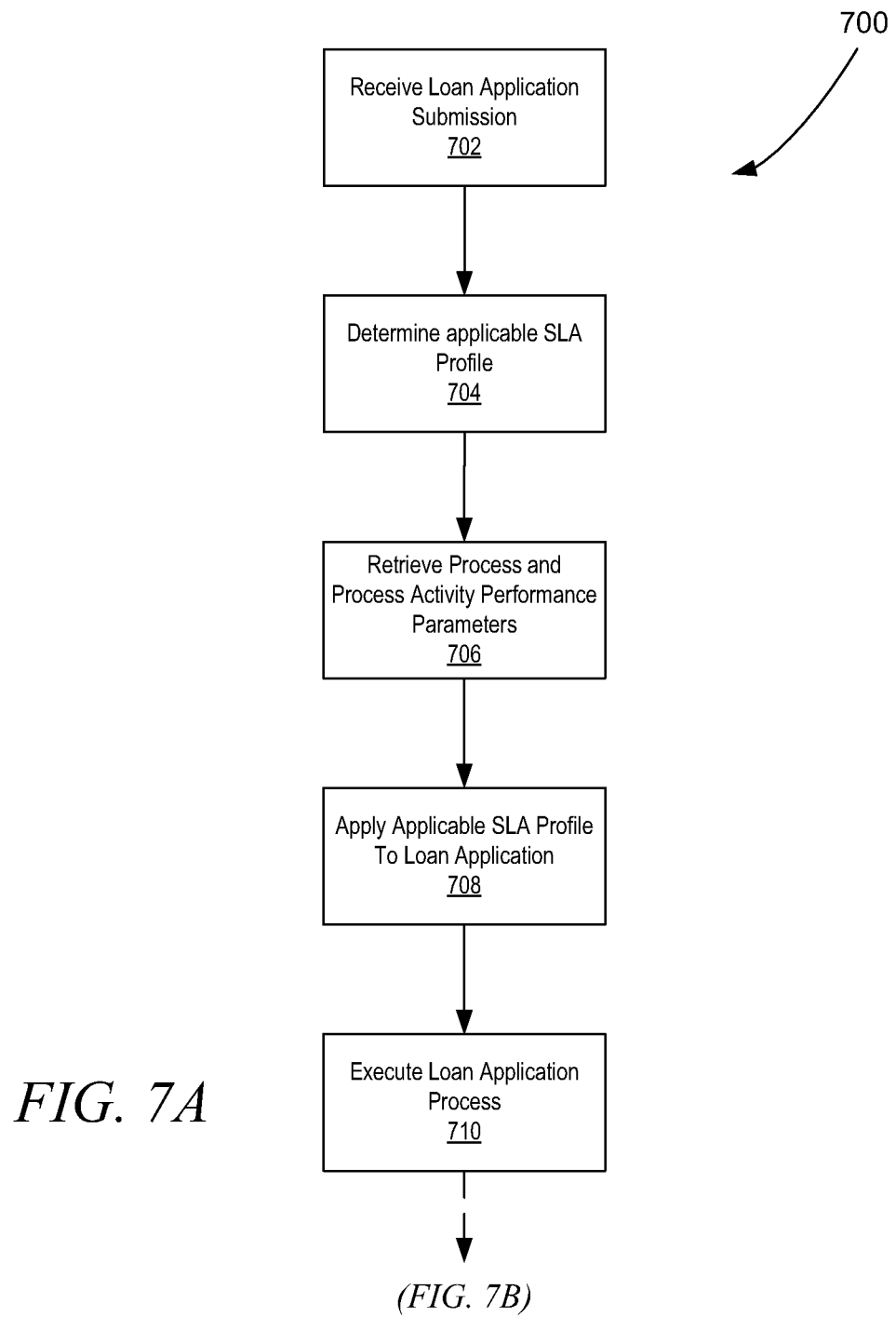
FIGS. 7A and 7B is a schematic flow chart illustrating an example embodiment of a method of managing a process to provide SLA profile differentiation or SLA profiling in a common logical process model.

Turning now to FIG. 7A, the flowchart indicates a method 700 for applying SLA differentiation to the process 600 of FIG. 6. The method 700 commences when the loan application is submitted, at operation 702. Thereafter, an applicable SLA profile is determined, at operation 704, by the rules engine 202 of FIG. 2.

In the example embodiment of FIG. 7A, two different SLA profiles 332 are potentially applicable to the process 600 of FIG. 6. In particular, a normal SLA profile ("nt_profile") or an expedited or fast profile ("ft_profile") may be applied to respective instances of the process 600. To this end, the SLA profile information 330 may include respective SLA profile records for these SLA profiles 332, comprising information regarding the process activities and performance metrics or goals for each process. Such information may be in the form of process activity identifiers 334 and associated performance metrics 336 (see FIG. 3). In this embodiment, each performance metric 336 forming part of the SLA profile 332 comprises a time limit or period within which the associated process/process activity should be completed. Table 1 below shows exemplary SLA profile information 330 in the form of two SLA profile records for the SLA profiles nt_profile and ft_profile respectively:

TABLE 1

| SLA Profile | Performance metrics |
|---|---|
| Ft_profile | Total_ProcessSLA = 5 d |
| | Preliminary_Process = 2 h |
| | Credit_Scoring = 1 d |
| | Pricing = 1 d |
| | Credit_Decision = 3 h |
| | Prepare_Disbursal = 1 d |
| | Appraise_Applicant = 5 h |
| Nt_profile | Total_ProcessSLA = 10 d |
| | Preliminary_Process = 5 h |
| | Credit_Scoring = 2 d |
| | Pricing = 2 d |
| | Credit_Decision = 3 h |
| | Prepare_Disbursal = 3 d |
| | Appraise_Applicant = 1 d |

From Table 1, it can be seen that each SLA profile 332 includes an overall performance metric with respect to the process as a whole, as well as activity performance metrics with respect to individual process activities. The total process 600 is to be performed in five days in accordance with the fast SLA profile (ft_profile), while the corresponding overall performance metric for the normal SLA profile (nt_profile) is 10 days. The respective activity performance metrics for individual process activities or steps may likewise be different for the different SLA profiles 332. Thus, for instance, the performance goal or parameter for the process activity of preliminary processing of the loan application, at operation 602, is two hours for the fast profile (ft_profile), but it is five hours for the normal profile (nt_profile); the performance metric for pricing and deal structuring, at operation 606, is one day for the fast SLA profile, but it is two days for the normal profile, and so forth.

Which of the above described SLA profiles 332 applies to a particular instance or case of the process 600 depends on the particulars of a process instance, which are contained in associated case data 370 (see FIG. 3). To this end, referring now to FIG. 7A, case data is 370 captured upon loan application submission, at operation 702. The case data 370 may reflect details or information pertaining to entities associated with the process instance or case. In the present example embodiment, the case data 370 includes information indicating whether the applicant or proposed borrower is a salaried individual, is self-employed, or is a "high net worth individual," as defined in the system 102. In some embodiments, some case data variables may be limited to selection from a set of predetermined options. Data entry compliance may be enforced by obligating an operator submitting or processing the loan application to enter a variable for a particular characteristic (such as an income type), and by limiting entry of such variables to selection from the predetermined set of options, e.g., by way of a drop-down menu.

In the example embodiment of FIGS. 6 and 7A, the case data 370 further includes data on the applicant's employment term (i.e., how long the applicant has been employed by their current employer) and the applicant's annual income. The loan applicant is also referred to herein as the borrower.

Example SLA profile decision rules 338 (applicable to the SLA profiles 332 reflected in Table 1) are shown in Table 2 below:

TABLE 2

| Condition | Action |
| --- | --- |
| borrowerType = "Salaried" and yearsinemployement > 5 and yrlyIncome > 1000000 INR | SLAProfile = "ft_profile" else SLAProfile = "nt_profile" |
| BorrowerType = "HighNetWorth" | SLAProfile = "ft_profile" |

The rules engine 202 executes, at operation 704, the SLA profile decision rules 338 to determine the applicable SLA profile for a particular process instance. If, for a particular case, the loan applicant is a salaried individual earning more than $100,000 a year, and has been employed for more than five years, the fast SLA profile ("ft_profile") is applicable to the case. If the loan applicant is a "high net worth individual" as defined by process prerequisites, the fast SLA profile ("ft_profile") is likewise identified as being applicable to the process instance or case. If, however, the borrower is not salaried or has been in employment for less than five years or has an annual income below $100,000, and is not a "high net worth individual," then the normal SLA profile ("nt_profile") is identified as being applicable to the process instance.

After identifying the applicable SLA profile, the SLA profile module 208 recovers the applicable SLA profile information 330, in particular the respective process and/or process activity performance metrics 336, at operation 706, and applies the performance metrics 336 to the corresponding process activities, at operation 708.

The process 600 is thereafter executed for the particular case, at operation 710, with the respective performance metrics 336 of the applicable SLA profile 332. The system 102 monitors SLA compliance based on the performance metrics 336 of the applicable SLA profile 332, while caseload management and caseload projection are likewise based on the applicable SLA profile 332.

Figure 7B:
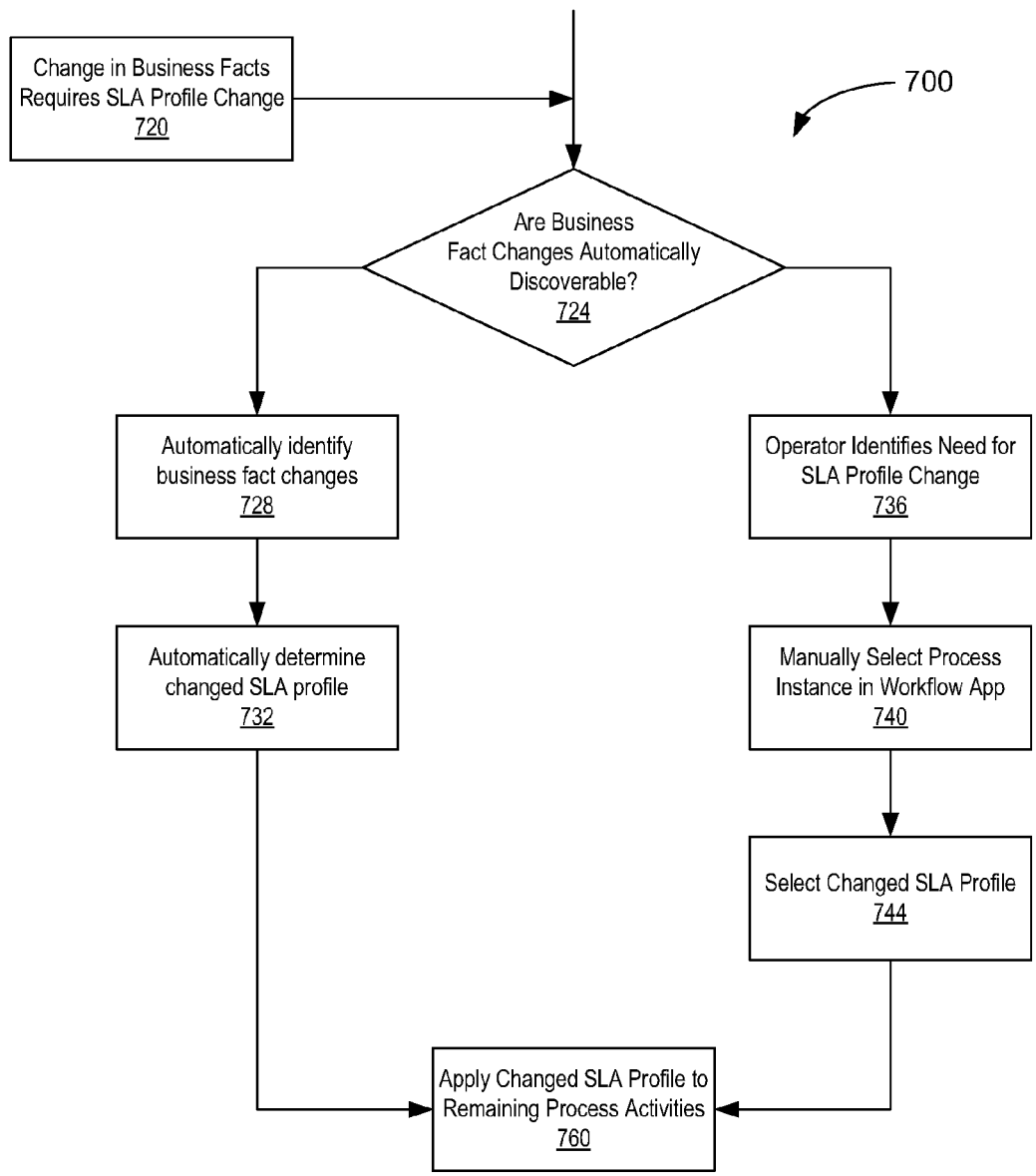

It may occur that changes in business facts or case data result in a different SLA profile 332 being applicable to a process instance during execution of the process 600. In such instances, the method 700 may in some circumstances comprise altering the applicable SLA profile 332 and applying performance metrics 336 of an altered or different SLA profile to remaining process activities. Such midstream or in-flight SLA profile alteration is shown schematically in FIG. 7B.

During execution of the process instance for which an applicable SLA profile 332 has been determined and applied, a change in business facts or case data, at operation 720, may require an SLA profile change. If, for example, the loan applicant previously earned less than $100,000 a year and was thus assigned the normal SLA profile (nt_profile), but now receives a raise and earns more than $100,000 a year, the fast SLA profile (ft_profile) should now apply to the process instance for that loan applicant. In some cases, the change in business facts giving rise to a change in SLA profile is automatically discoverable, as illustrated by decision operation 724. For example, the SLA profile module 208 or SLA update module 230 may be in communication with or may monitor case data 370 stored in, for example, an applicant or employee database having information with respect to salaries for loan applicants. When the salary of the loan applicant in the current example thus crosses the $100,000 threshold, the SLA update module 230 may automatically identify this status change, at operation 728, and may generate an SLA change prompt or SLA change event.

In response to such an SLA change prompt, the SLA profile module 208 may automatically determine a newly applicable SLA profile 332, at operation 732, and may retrieve the performance metrics 336 for the new or different SLA profile 332. Thereafter, the new or changed SLA profile 332 may be applied to remaining process activities, at operation 760.

However, business facts changes may, in some embodiments, not be automatically discoverable. In such instances, a human operator may identify a need for SLA profile change, at operation 736, and may then manually apply a changed SLA profile to the process instance. The operator may thus manually select the appropriate process instance, at operation 740, for example through operation of the workflow module 220 for a workflow application which manages performance of a multiplicity of instances of the process 600. The operator may then select a newly applicable SLA profile 332, at operation 744. In other embodiments, the operator may manually trigger recalculation of the applicable SLA profile 332 by the rules engine 202, based on altered case data. Thereafter, the newly applicable SLA profile 332 is applied to remaining process activities of the relevant process instance, at operation 760.

In process instances where an in-flight SLA profile change is effected, an instance of the process may thus be implemented with some process activities subjected to the associated performance metrics of one SLA profile 332 (e.g. the nt_profile), and other process activities subjected to respective performance metrics of another SLA profile 332 (e.g. the ft_profile). Moreover, it will be appreciated that, in some instances, an overall performance metric of the newly applicable SLA profile 332 with respect to the entire process 600 may no longer be attainable when the newly applicable SLA profile 332 is applied, in which case the overall performance metric may be inoperative. For example, if the nt_profile is initially applied to the process 600 of FIG. 6 for a particular instance, a process completion metric or overall performance metric is initially 10 days. If, however, the SLA profile 332 is changed to the ft_profile by, e.g., six days after commencement of the process instance, the ft_profile overall performance metric of five days can no longer be met. In such cases, the individual activity metrics are merely applied to the associated remaining process activities.

In some embodiments, at least some of the SLA profiles of a plurality of SLA profiles 332 that are potentially applicable to a process may be configured to select, from a common logical process model 312, a subset of process activities that are to be performed in execution of the process instance. The particular sequence of process activities that are to be executed is in such cases dependent on the particular SLA profile 332 which is applied to that process instance, so that different instances of the process, having different SLA profiles 332 applies thereto, may comprise a different sequence of activities or operations. Nevertheless, the process activities are in each instance selected from a common logical process model 312 based on the respective SLA profiles 332.

Figure 8:
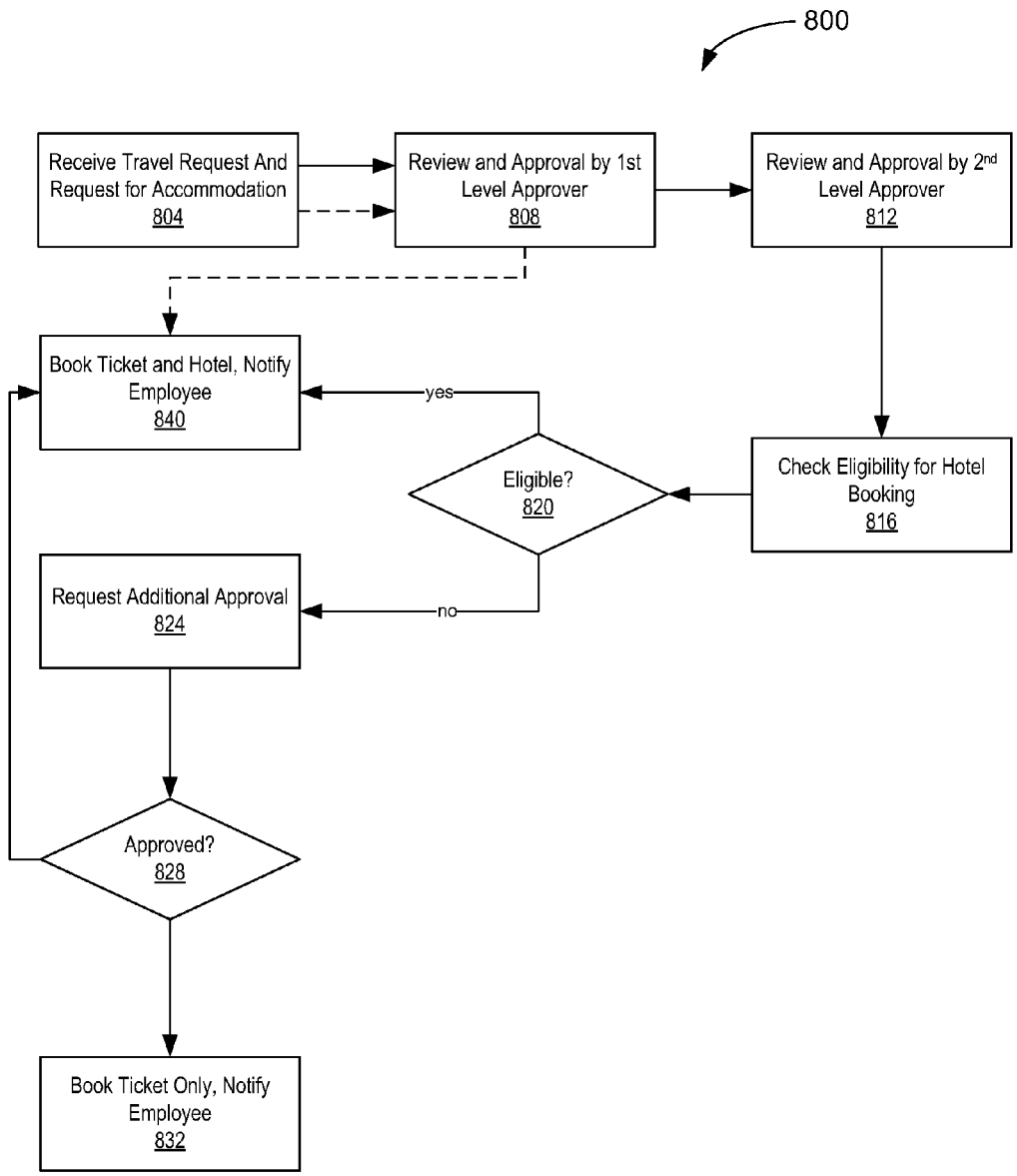
FIG. 8 is another example embodiment of logical process model information mapping a sequence of process activities constituting a process.

An example embodiment of common logical process model information in the form of a common logical process model for an example process 800 shown schematically in FIG. 8. The travel management process 800 is a process for the booking of accommodation and travel arrangements in response to employee request therefor. The process 800 again has associated therewith two SLA profiles 332 identified as a normal profile (nt_profile) and a fast profile (ft_profile). The sequence of operations performed by a process instance to which the nt_profile is applied is shown in FIG. 8 as being connected by solid line arrows, while the sequence of operations to be performed by a process instance to which the ft_profile is applied is shown as being connected by dashed line arrows. The sequence of process activities for the nt_profile will be described first.

A process instance begins when a request for travel and accommodation is received, at operation 804. The application is thereafter reviewed by a first level approver, at operation 808. If approved by the first level approver, the application is reviewed by a second level approver, at operation 812. Thereafter, the applicant's eligibility for a hotel booking is checked, at operation 816, and it is determined whether the applicant is eligible for hotel booking at operation 820.

If the applicant is eligible for hotel booking, a ticket and hotel is booked and the applicant is notified thereof, at operation 840. If, however, the applicant is not eligible for hotel booking, additional approval is requested, at operation 824. If additional approval is granted, at decision operation 828, a ticket and hotel are booked, at operation 840, and the applicant is notified thereof. If, however, the additional approval is denied at decision operation 828, only a ticket, but not the hotel, is booked at operation 832, and the applicant is notified thereof.

In contrast, some of the process steps or activities in the travel management process 800 will be bypassed in process instances to which the ft_profile is applied. In such instances, receipt of the travel and accommodation request, at operation 804, is followed by first level review and approval, at operation 808, and thereafter directly by ticket and hotel booking and applicant notification, at operation 840. Therefore, when the ft_profile is applied to a process instance, at least operations such as second-level approval (operation 812), and checking for hotel booking eligibility (operation 816) are bypassed. In some instances, additional operations such as request for additional approval (operation 824) are also bypassed, in the sense that it is an operation that would have been performed for the associated applicant, had the nt_profile been applied to that process instance.

It will thus be seen that the process activities that are executed under the ft_profile constitute a subset of the common logical process model, and, in the particular example embodiment, is a subset of process activities performed under the nt_profile.

Although both the above-mentioned example embodiments have performance metrics comprising time goals, other embodiments may have different types of performance metrics such as, for example, cost, product/service quality, and the like, as well as combinations thereof.

The rules engine 202 may be configured to determine an applicable SLA profile for the example embodiment of FIG. 8 based on an employee rate. In this example, the ft_profile is applied to employees having an employee grade (which is internal to the relevant organization) higher than "E5," while the nt_profile is applied to employees having an employee grade lower than or equal to "E5." As is the case with the example process 600, and as schematic illustrated in method 700, the applicable SLA profile 332 may be changed in-flight during execution of a particular instance of process 800. If, for example, an employee's grade changes from E5 to E6 during the course of a process instance, the applicable SLA profile 332 may likewise be changed from the normal track (nt_profile) to the fast track (ft_profile).

In instances where a current status or progress of the process instance is at an activity that forms part of a currently applicable SLA profile 332 but does not form part of the process under a newly applicable SLA profile 332, the process may progress to the activity immediately following the most advanced completed activity under the newly applicable SLA profile 332. For example, if, in the travel management process 800, a process instance executed under the nt_profile is currently at the stage of second-level review and approval, at operation 812, or is at the stage of requesting additional approval, at operation 824, and is then changed to the ft_profile, that particular instance of the process 800 may directly be changed, by the workflow module 220, to the booking and notification activity, at operation 840.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
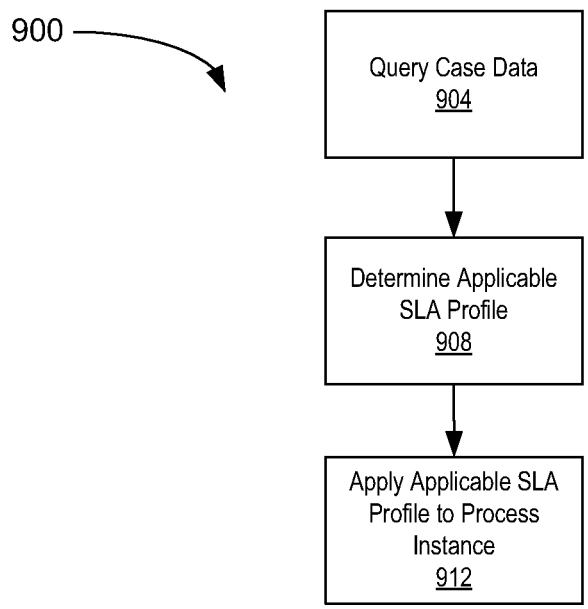
FIG. 9 is a high-level flow chart of an example method of providing SLA profile differentiation or SLA profiling in the management of a process.

FIG. 9 is a high-level view of another embodiment of a method 900 to provide SLA differentiation in implementation of a process. The method 900 comprises, at operation 904, automatically querying case data 370 (FIG. 3) with respect to a particular process instance that is to be performed with support of a process management system which includes a logical process model 312 comprising a logically structured series of process activities constituting the process. The method 900 further comprises the automated operation of, at operation 908, determining an applicable SLA profile 332 for the particular process instance based at least in part on the case data 370. The applicable SLA profile 332 is selected from a plurality of SLA profiles 332 that applies to a single process modeled by the logical process model 312, so that the logical process model 312 is common to the plurality of SLA profiles 332.

The method 900 may further comprise applying the applicable SLA profile 332 to the particular process instance, at operation 912, automatically associating with at least some process activities selected from the logical process model 312 respective performance metrics 336 corresponding to the applicable SLA profile 332.

Figure 10:
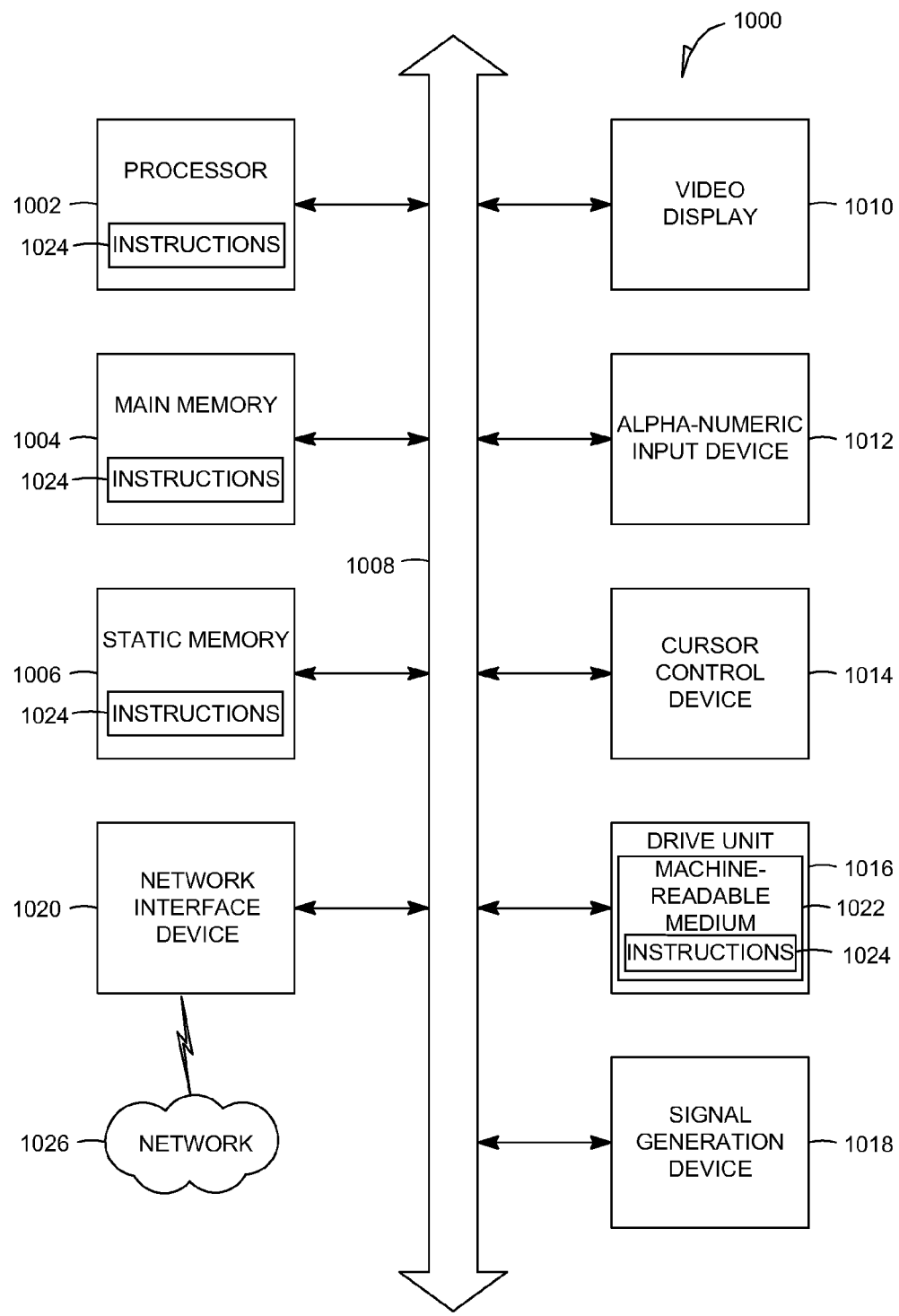
FIG. 10 is a diagrammatic representation of a machine in the example form of a computer system within which a set of instructions for causing the machine to perform any one or more of the methodologies discussed herein may be executed.

FIG. 10 shows a diagrammatic representation of a machine in the example form of a computer system 1000 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media.

Thus, a method and system to manage a process and provide SLA differentiation with respect to a common logical process model has been described. Although the present disclosure has been with reference to specific example embodiments, it will be evident that various modifications and changes may be made to these embodiments without departing from the broader spirit and scope of the method and/or system. Accordingly, the specification and drawings are to be regarded in an illustrative rather than a restrictive sense.

The Abstract of the Disclosure is provided to comply with 37 C.F.R. 81.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments comprise more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one memory to store
      a logical process model defining a logically structured series of process activities in a process, and
      Service Level Agreement (SLA) profile information defining a predefined plurality of SLA profiles which are potentially applicable to respective process instances of a process defined by a logical process model comprising a logically structured series of process activities, each SLA profile comprising at least one performance metric with respect to the process and/or at least one of the process activities;
   a rules engine to query case data with respect to a particular process instance, and automatically to determine an applicable SLA profile for the particular process instance based at least in part on the case data, the applicable SLA profile being selected from the predefined plurality of SLA profiles; and
   a computer including an SLA profile module to apply the applicable SLA profile to the particular process instance; and
   an SLA update module configured to apply a different SLA profile to the particular process instance during performance of the particular process instance, subsequent to initial application of the applicable SLA profile to the particular process instance, the SLA update module further being configured to automatically determine, in response to a change in the case data for the particular process instance, that an SLA profile other than the previously determined applicable SLA profile is applicable to the particular process instance, and automatically to apply the different SLA profile to the particular process instance.

2. The system of claim 1, wherein the SLA profile module is configured such that application of the applicable SLA profile to the particular process instance comprises automatically associating with at least some process activities selected from the logical process model respective activity performance metrics corresponding to the applicable SLA profile, the logical process model being common to the predefined plurality of SLA profiles in that the at least some process activities are selected from the common logical process model irrespective of which one of the predefined plurality of SLA profiles is determined to be the applicable SLA profile.

3. The system of claim 2, wherein the SLA profile module is configured to select from the common logical process model, based on the applicable SLA profile, a subset of process activities which are to be performed in execution of the particular process instance.

4. The system of claim 2, in which each SLA profile comprises a set of process activity identifiers and associated activity performance metrics.

5. The system of claim 4, wherein the set of process activity identifiers for at least one of the SLA profiles comprises all of the process activities of the common logical process model.

6. The system of claim 4, wherein the set of process activity identifiers for at least one of the SLA profiles comprises a subset of the process activities of the common logical process model.

7. The system of claim 1, wherein the logical process model comprises metadata associated with at least some process activities forming part of the logical process model, to indicate associations between process activities and SLA profiles, metadata associated with at least one process activity indicating a plurality of SLA profiles with which the at least one process activity is associated.

8. The system of claim 1, wherein the SLA profile module is configured such that application of the applicable SLA profile to the particular process instance comprises automatically associating an overall performance metric with the particular process instance.

9. The system of claim 1, wherein the SLA update module is configured to automatically associate with one or more remaining process activities respective activity performance metrics corresponding to the different SLA profile.

10. The system of claim 1, wherein the SLA update module is configured to receive user input indicating a desired change in SLA profile, and to apply the different SLA profile to the particular process instance in response to the user input.

11. The system of claim 1, further comprising the logical process model defining the logically structured series of process activities comprising the process.

12. A method comprising:
querying case data with respect to a particular process instance of a process which is to be performed with support of a process management system, the process management system including a logical process model defining a logically structured series of process activities constituting the process;
using one or more processors, automatically determining an applicable Service Level Agreement (SLA) profile for the particular process instance based at least in part on the case data, the applicable SLA profile being selected from a predefined plurality of SLA profiles which are potentially applicable to respective process instances of the process defined by the logical process model, each SLA profile comprising at least one performance metric with respect to the process and/or at least one of the process activities;
applying the applicable SLA profile to the particular process instance; and
applying a different SLA profile to the particular process instance during performance of the particular process instance, subsequent to initial application of the applicable SLA profile to the particular process instance, wherein applying the different SLA profile to the particular process instance is preceded by automatically determining, in response to a change in the case data for the particular process instance, that an SLA profile other than the previously determined applicable SLA profile is applicable to the particular process instance.

13. The method of claim 12, wherein applying the applicable SLA profile to the particular process instance comprises automatically associating with at least some process activities selected from the logical process model respective activity performance metrics corresponding to the applicable SLA profile, the logical process model being common to the predefined plurality of SLA profiles in that the at least some process activities are selected from the common logical process model irrespective of which one of the predefined plurality of SLA profiles is determined to be the applicable SLA profile.

14. The method of claim 13, further comprising selecting from the common logical process model, based on the applicable SLA profile, a subset of process activities which are to be performed in execution of the particular process instance.

15. The method of claim 13, in which each SLA profile comprises a set of process activity identifiers and associated activity performance metrics.

16. The method of claim 15, wherein the set of process activity identifiers for at least one of the SLA profiles comprises all of the process activities of the common logical process model.

17. The method of claim 15, wherein the set of process activity identifiers for at least one of the SLA profiles comprises a subset of the process activities of the common logical process model.

18. The method of claim 12, wherein the logical process model comprises metadata associated with at least some process activities forming part of the logical process model, to indicate associations between process activities and SLA profiles, metadata associated with at least one process activity indicating a plurality of SLA profiles with which the at least one process activity is associated.

19. The method of claim 12, wherein applying the applicable SLA profile to the particular process instance comprises automatically associating an overall performance metric with the particular process instance.

20. The method of claim 12, wherein applying the different SLA profile to the particular process instance comprises automatically associating with one or more remaining process activity respective activity performance metrics corresponding to the different SLA profile.

21. The method of claim 12, wherein applying the different SLA profile to the particular process instance is in response to receiving user input indicating a desired change in SLA profile.

22. A non-transitory machine-readable storage medium storing instructions which, when performed by a machine, cause the machine to perform operations comprising:
query case data with respect to a particular process instance of a process which is to be performed with support of a process management system, the process management system including a logical process model defining a logically structured series of process activities constituting the process;
automatically determining an applicable Service Level Agreement (SLA) profile for the particular process instance based at least in part on the case data, the applicable SLA profile being selected from a predefined plurality of SLA profiles which are potentially applicable to respective process instances of the process defined by the logical process model, each SLA profile comprising at least one performance metric with respect to the process and/or at least one of the process activities;
applying the applicable SLA profile to the particular process instance; and
applying a different SLA profile to the particular process instance during performance of the particular process instance, subsequent to initial application of the applicable SLA profile to the particular process instance, wherein applying the different SLA profile to the particular process instance is preceded by automatically determining, in response to a change in the case data for the particular process instance, that an SLA profile other than the previously determined applicable SLA profile is applicable to the particular process instance.

* * * * *

UNITED STATES PATENT AND TRADEMARK OFFICE
CERTIFICATE OF CORRECTION

PATENT NO. : 8,756,251 B2  
APPLICATION NO. : 13/186124  
DATED : June 17, 2014  
INVENTOR(S) : Chodavarapu et al.

Page 1 of 1

It is certified that error appears in the above-identified patent and that said Letters Patent is hereby corrected as shown below:

In the Claims:

In column 21, line 59, in Claim 1, after "store", insert --:--, therefor

Signed and Sealed this
Twenty-first Day of October, 2014

Michelle K. Lee
*Deputy Director of the United States Patent and Trademark Office*